US008714581B2

(12) United States Patent
Fritz et al.

(10) Patent No.: US 8,714,581 B2
(45) Date of Patent: May 6, 2014

(54) COMPACT FOLDABLE STROLLER

(71) Applicant: Cosco Management, Inc., Wilmington, DE (US)

(72) Inventors: Ward A. Fritz, Westwood, MA (US); Dana E. Chicca, Swansea, MA (US); Walter S. Bezaniuk, Berkley, MA (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 13/757,526

(22) Filed: Feb. 1, 2013

(65) Prior Publication Data

US 2013/0140797 A1 Jun. 6, 2013

Related U.S. Application Data

(63) Continuation-in-part of application No. 13/532,452, filed on Jun. 25, 2012, now abandoned, and a continuation of application No. 12/693,249, filed on Jan. 25, 2010, now Pat. No. 8,205,907.

(51) Int. Cl.
*B62B 1/00* (2006.01)

(52) U.S. Cl.
USPC ........... 280/642; 280/643; 280/647; 280/648; 280/650

(58) Field of Classification Search
USPC .................. 280/642, 643, 647, 648, 650
See application file for complete search history.

(56) References Cited

U.S. PATENT DOCUMENTS

| 2,986,400 | A | | 5/1961 | Phillips | |
|---|---|---|---|---|---|
| 4,216,974 | A | | 8/1980 | Kassai | |
| 4,294,464 | A | | 10/1981 | Ettridge | |
| 4,544,178 | A | * | 10/1985 | Al-Sheikh et al. | 280/642 |
| 4,614,454 | A | * | 9/1986 | Kassai | 403/62 |
| 4,834,403 | A | * | 5/1989 | Yanus et al. | 280/30 |
| 5,257,799 | A | | 11/1993 | Cone et al. | |
| 6,086,086 | A | * | 7/2000 | Hanson et al. | 280/650 |
| 6,095,548 | A | | 8/2000 | Baechler | |
| 6,102,431 | A | | 8/2000 | Sutherland et al. | |
| 6,102,432 | A | * | 8/2000 | Cheng | 280/642 |
| 6,105,998 | A | | 8/2000 | Baechler et al. | |
| 6,270,111 | B1 | * | 8/2001 | Hanson et al. | 280/650 |
| 6,869,096 | B2 | | 3/2005 | Allen et al. | |
| 6,991,248 | B2 | | 1/2006 | Valdez et al. | |
| 7,077,420 | B1 | | 7/2006 | Santoski | |
| 7,185,909 | B2 | | 3/2007 | Espenshade et al. | |

(Continued)

FOREIGN PATENT DOCUMENTS

| EP | 0090668 | 5/1983 |
|---|---|---|
| EP | 066332 | 7/1995 |

(Continued)

OTHER PUBLICATIONS

International Search Report dated Feb. 12, 2009, relating to International Application No. PCT/US08/86415.

(Continued)

*Primary Examiner* — J. Allen Shriver, II
*Assistant Examiner* — James M Dolak
(74) *Attorney, Agent, or Firm* — Barnes & Thornburg LLP

(57) ABSTRACT

A juvenile stroller includes a mobile base and a juvenile seat mounted on the mobile base. The mobile base includes wheels and a foldable frame carrying the juvenile seat.

31 Claims, 9 Drawing Sheets

(56) References Cited

U.S. PATENT DOCUMENTS

| | | | |
|---|---|---|---|
| 7,237,795 B2 | 7/2007 | Wu | |
| 7,296,820 B2 | 11/2007 | Valdez et al. | |
| 7,396,039 B2 | 7/2008 | Valdez et al. | |
| 7,404,569 B2 * | 7/2008 | Hartenstine et al. | 280/642 |
| 7,614,641 B2 * | 11/2009 | Hartenstine et al. | 280/642 |
| 7,632,035 B2 | 12/2009 | Cheng | |
| 7,712,765 B2 * | 5/2010 | Chen et al. | 280/642 |
| 7,798,500 B2 | 9/2010 | Den Boer | |
| 7,798,515 B2 | 9/2010 | Valdez et al. | |
| 7,832,755 B2 * | 11/2010 | Nolan et al. | 280/642 |
| 7,832,756 B2 * | 11/2010 | Storm | 280/642 |
| 8,087,689 B2 | 1/2012 | Fritz et al. | |
| 8,205,907 B2 | 6/2012 | Chicca | |
| 8,251,382 B2 * | 8/2012 | Chen et al. | 280/47.41 |
| 8,444,170 B2 * | 5/2013 | Chen et al. | 280/642 |
| 2006/0038378 A1 | 2/2006 | Lee | |
| 2006/0082104 A1 | 4/2006 | Wu | |
| 2007/0063487 A1 | 3/2007 | Wu | |
| 2007/0075525 A1 | 4/2007 | Nolan et al. | |
| 2007/0096434 A1 | 5/2007 | Haeggberg | |

FOREIGN PATENT DOCUMENTS

| | | |
|---|---|---|
| EP | 1647463 | 4/2006 |
| EP | 1967439 | 10/2008 |
| FR | 2394434 | 12/1979 |
| WO | 2008145523 | 12/2008 |

OTHER PUBLICATIONS

International Preliminary Report on Patentability (Chapter II) completed by the US Examining Authority on Oct. 9, 2010, relating to International Application No. PCT/US08/86415.

International Search Report dated Sep. 13, 2010, relating to Netherlands Application No. 2004371.

Annex to European Search Report dated Apr. 11, 2011, relating to European Application EP11157355.

* cited by examiner

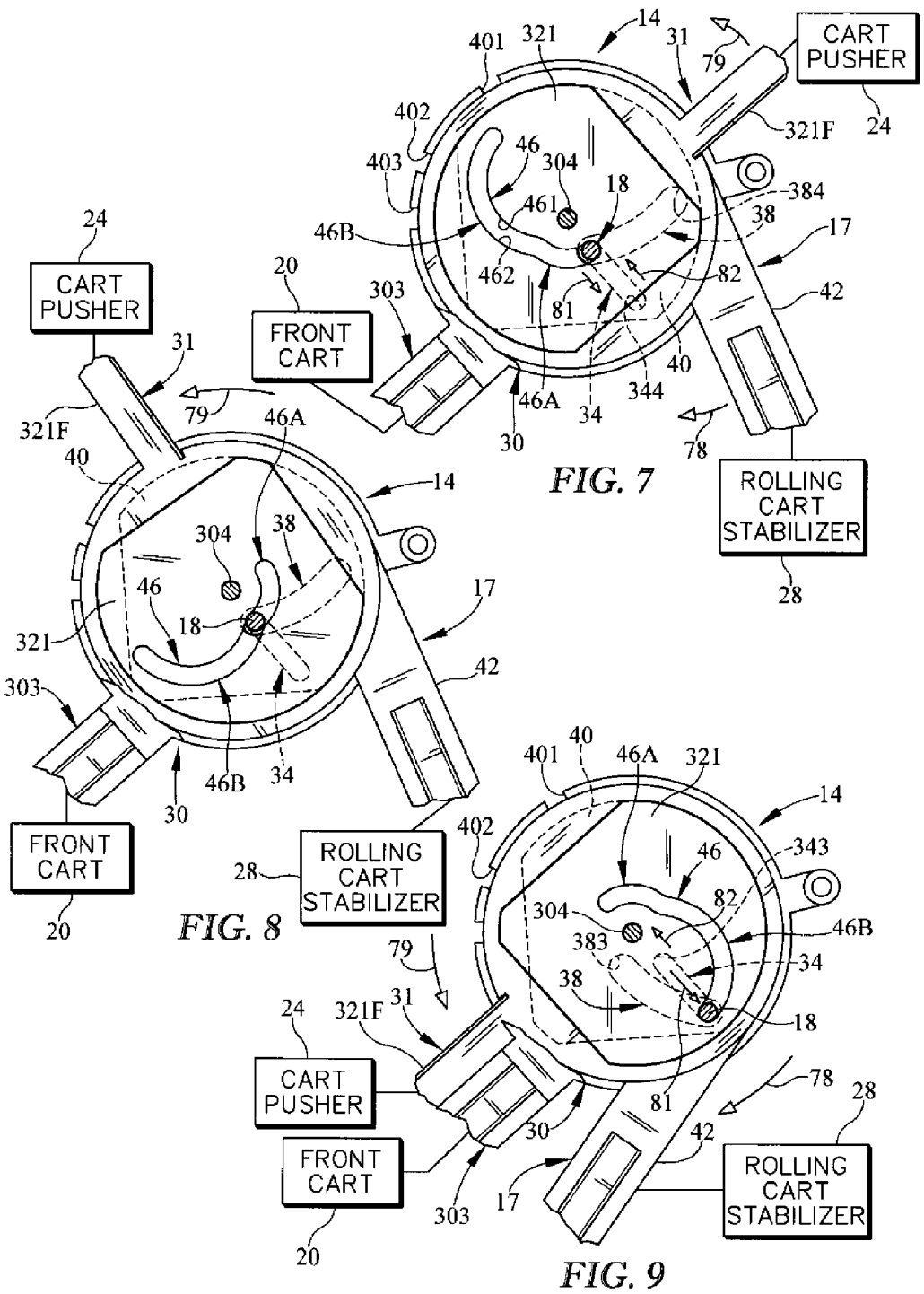

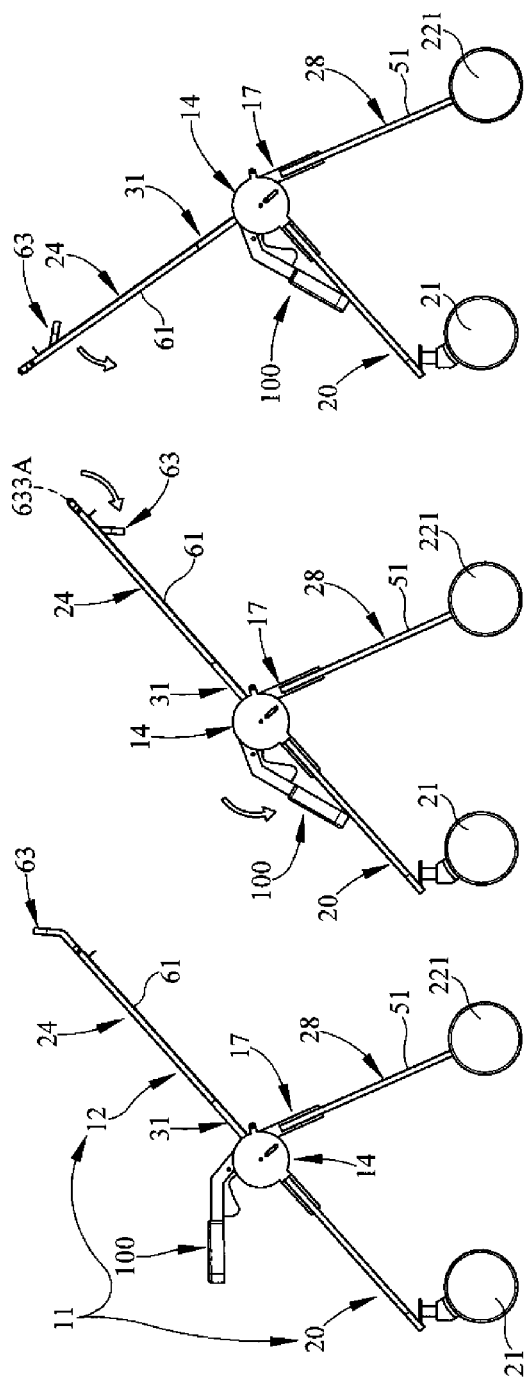
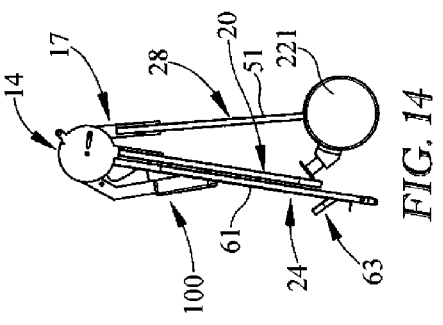
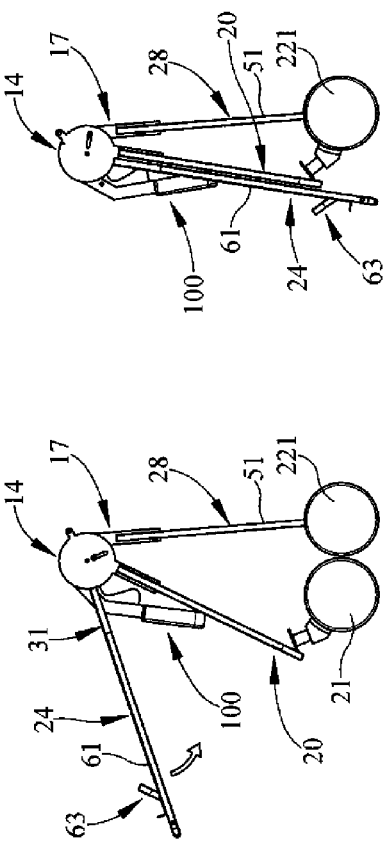
FIG. 10
FIG. 11
FIG. 12
FIG. 13
FIG. 14

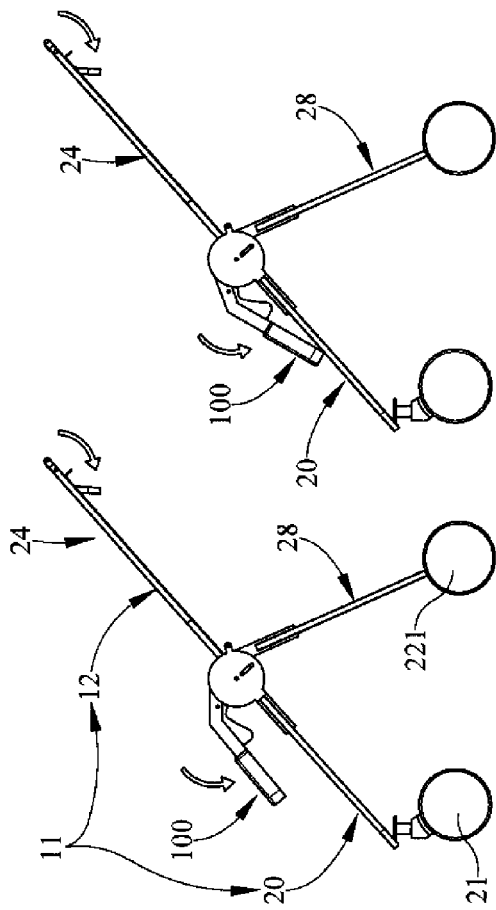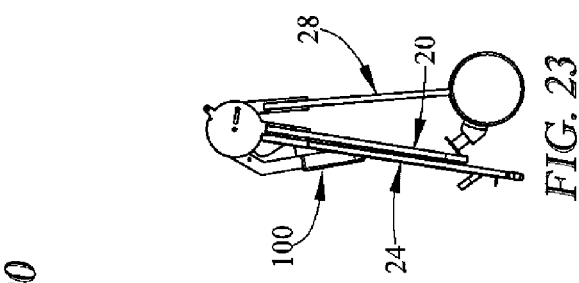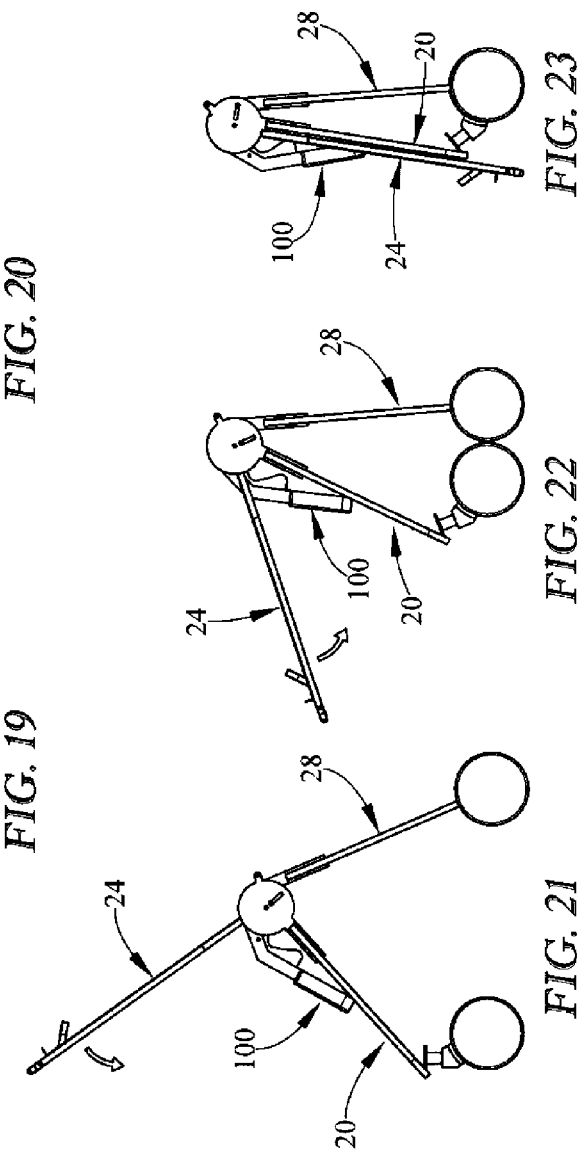

COMPACT FOLDABLE STROLLER

PRIORITY CLAIM

This is a continuation-in-part of U.S. application Ser. No. 13/532,452, filed Jun. 25, 2012, which is a continuation of U.S. application Ser. No. 12/693,249, filed Jan. 25, 2010 (now U.S. Pat. No. 8,205,907, issued Jun. 26, 2012), both of which are expressly incorporated by reference herein.

BACKGROUND

The present disclosure relates to collapsible strollers for juveniles, and particularly to strollers including a collapsible frame assembly, a seat, and several wheels. More particularly, the present disclosure relates to collapsible frame assemblies for juvenile strollers.

SUMMARY

A compact collapsible stroller in accordance with the present disclosure includes a mobile base and a juvenile seat coupled to the mobile base. The mobile base includes a foldable frame and front and rear wheels.

In illustrative embodiments, the mobile base of the compact collapsible stroller comprises a front cart including two front wheels and a cam-driven foldable frame mounted on the cart to move therewith and configured to include two rear wheels. The cam-driven foldable frame includes a cart pusher formed to include a push handle, a rolling cart stabilizer configured to include the two rear wheels, and a first cam-fold unit coupled to the front cart and to each of the cart pusher and the rolling cart stabilizer. When the cart pusher is rotated about a pivot axis toward the front wheels, a cam provided in the cam-driven foldable frame drives the rolling cart stabilizer and its rear wheels toward the front cart and its front wheels to cause the foldable frame to fold. Similarly, the foldable frame unfolds when the cart pusher is rotated about the pivot axis in the opposite direction away from the front wheels.

In illustrative embodiments, the first cam-fold unit includes a cam-support base, an inverse cam including a follower and a motion-transfer pin, and first and second pin movers. The motion-transfer pin is arranged to extend into and move back and forth simultaneously in a straight pin-receiver slot formed in the cam-support base, a curved motion-transfer slot formed in the follower, and a curved motion-inducement slot formed in each of the pin movers. The pin movers are coupled to the cart pusher to move therewith relative to the front cart. The rolling cart stabilizer is coupled to the follower to move therewith relative to the front cart.

In use, the motion-transfer pin moves in the four slots provided in the first cam-fold unit in response to caregiver-controlled movement of the cart pusher relative to the front cart. Such movement causes the rolling cart stabilizer to move relative to the front cart between an unfolded position extending rearwardly away from the front cart associated with an expanded use mode of the stroller and a folded position lying alongside the front cart associated with a compact collapsed storage mode of the stroller.

In illustrative embodiments, each of the pin movers that is included in the first cam-fold unit and is coupled to the cart pusher is configured to move the motion-transfer pin of the inverse cam in each of the four slots simultaneously in response to movement of the cart pusher about the pivot axis in a counterclockwise direction toward the front cart to cause the follower and the rolling cart stabilizer coupled to the follower to pivot about the pivot axis in a clockwise direction toward the front cart to assume a folded position alongside a rear portion of the front cart so that the stroller is converted from an expanded use mode to a compact collapsed storage mode. Also in illustrative embodiments, the pin movers included in the first cam-fold unit are configured to move the motion-transfer pin of the inverse cam in each of the four slots simultaneously in response to movement of the cart pusher about the pivot axis in a counterclockwise direction away from the front cart to cause the follower and rolling cart stabilizer coupled to the follower to pivot about the pivot axis in a counterclockwise direction away from the front cart to assume an unfolded rear position extending in a rearward direction away from the front cart so that the stroller is converted from the compact collapsed storage mode to the expanded use mode.

In illustrative embodiments, the cam-driven foldable frame also includes a second cam-fold unit coupled to the front cart and arranged to lie in spaced-apart relation to the first cam-fold unit. One side rail of the card pusher is coupled to the first cam-fold unit while an opposite side rail of the pushcart is coupled to the second cam-fold unit. The second cam-fold unit is similar to the first cam-fold unit and includes a second cam-support base coupled to the front cart, an inverse cam including a second follower coupled to the rolling cart stabilizer and a second motion transfer pin, and two more pin-movers coupled to the cart pusher to move therewith.

In illustrative embodiments, the stroller also includes a feeding tray unit mounted on the mobile base for pivotable movement about the pivot axis. This feeding tray unit moves independently from the cart pusher and the rolling cart stabilizer under the control of a caregiver. The feeding tray unit is movable to assume a first position in juvenile stroller mode, a second position in infant stroller mode, and a third position in compact storage mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 7-9 show movement of the motion-transfer pin in three of the four slots provided in the first cam-fold unit of the fold-control system to cause clockwise pivoting movement of the rolling cart stabilizer (and its rear wheels) toward the front cart (and its front wheels) about the pivot axis in response to caregiver-induced counterclockwise pivoting movement of the cart pusher about the pivot axis toward the front cart to cause the shape of the juvenile stroller to be altered to assume a compact folded storage mode as shown, for example, in FIGS. 4 and 9;

FIG. 7 is an enlarged side elevation view of the first cam-fold unit when the mobile base is in an expanded use position shown in FIG. 2;

FIG. 8 is a view similar to FIG. 7 when the mobile base is in a partly collapsed mode shown in FIG. 3;

FIG. 9 is a view similar to FIGS. 7 and 8 when the mobile base is in a compact collapsed mode shown in FIG. 4;

FIGS. 10-14 are side elevation views of the mobile base of FIG. 2 as it is collapsed to change from the expanded use mode shown in FIG. 10 to the collapsed storage mode shown in FIG. 14;

FIGS. 19-23 are side elevation views of the mobile base of FIG. 16 as it is collapsed to change from an initial carrier-receiving mode shown in FIG. 20 to the collapsed storage position shown in FIG. 23.

DETAILED DESCRIPTION

Figure 4:
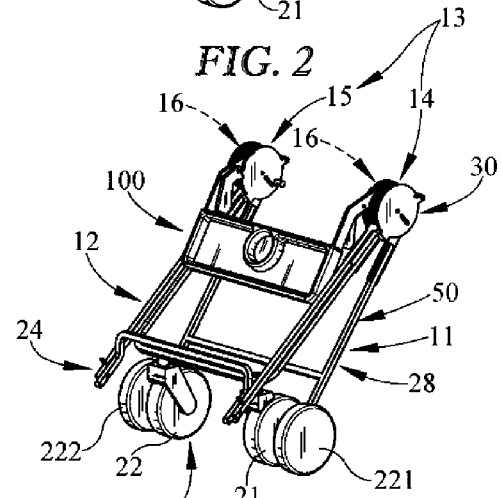
FIG. 4 is a perspective view of the juvenile stroller of FIGS. 1-3 (with the juvenile seat omitted) after it has been collapsed by a caregiver to assume a compact collapsed storage mode in a manner shown, for example, in FIGS. 10-14.

A juvenile stroller 10 is configured to be collapsed by a caregiver to change from an expanded use mode shown, for example, in FIGS. 1, 2, 10, and 11 to a compact collapsed storage mode shown, for example, in FIGS. 4 and 14 in a manner suggested, for example, in FIGS. 10-14. Juvenile stroller 10 includes a cam-driven foldable frame 12 having a fold-control system 13 configured to control folding and unfolding of components included in cam-driven foldable frame 12 as a caregiver changes the mode of juvenile stroller 10 as suggested in FIG. 2. In an illustrative embodiment, fold-control system 13 comprises separate first and second cam-fold units 14, 15 as suggested in FIG. 5A. Each cam-fold unit 14, 15 includes an inverse cam 16 comprising a follower 17 and a motion-transfer pin 18 as suggested in FIG. 5A.

Figure 1:
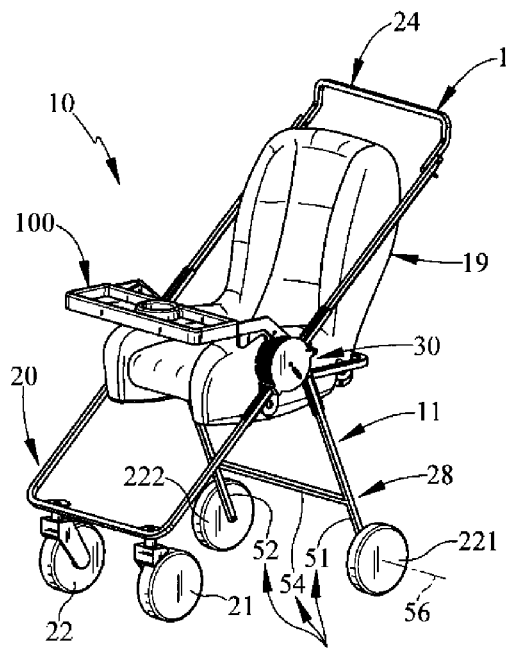
FIG. 1 is a perspective view of a collapsible juvenile stroller in accordance with the present disclosure showing a mobile base and a juvenile seat coupled to the mobile base and showing that the mobile base includes a cam-driven foldable frame that can be folded at the option of a caregiver from an unfolded position shown in FIGS. 1 and 2 to a folded position shown in FIG. 4.

Juvenile stroller 10 is a compact collapsible stroller including a mobile base 11 and a juvenile seat 19 mounted on mobile base 11 for motion therewith as suggested diagrammatically in FIG. 1. Juvenile stroller 10 also includes a pivotable feeding tray unit 100 mounted for movement on cam-fold units 14, 15 of fold-control system 13 as suggested in FIGS. 1-5A. In illustrative embodiments, mobile base 11 includes cam-driven foldable frame 12. It is within the scope of this disclosure to use any suitable juvenile seat. For example, as suggested in FIGS. 15-23, in accordance with another embodiment of the present disclosure, a juvenile stroller 200 includes a mobile base 11 and an infant carrier 229 adapted to mount on mobile base 11. A juvenile seat in accordance with the present disclosure could also be configured so as to remain coupled to cam-driven foldable frame 12 during folding and unfolding of frame 12.

As suggested in FIG. 1, mobile base 11 of juvenile stroller 10 includes a front cart 20 and cam-driven foldable frame 12. Cam-driven foldable frame 12 is mounted for folding and unfolding movement on front cart 20 as suggested in FIGS. 1-4 and 10-14. Front cart 20 includes first and second front wheels 21, 22 as suggested in FIGS. 1-4.

Figure 5A:
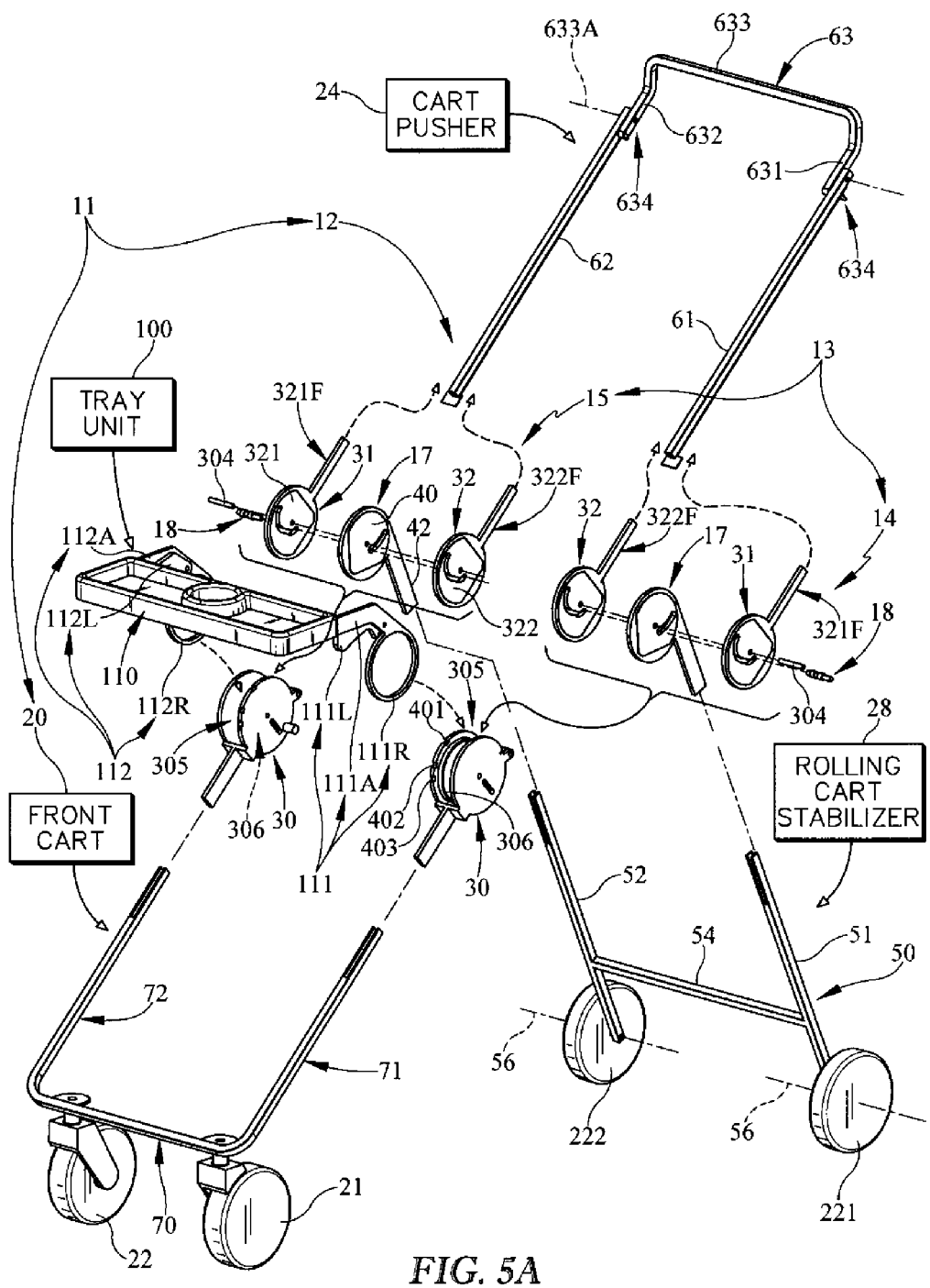
FIG. 5A is an exploded perspective assembly view showing the feeding tray unit and the components that cooperate to form the mobile base of the collapsible juvenile stroller of FIG. 1 and showing that the front cart includes a U-shaped front frame section and two front wheels, the rolling cart stabilizer includes an H-shaped rear frame section and two rear wheels, and the cart pusher includes spaced-apart first and second side rails and a push handle mounted for pivotable movement about its own pivot axis on upper ends of the first and second side rails.

Cam-driven foldable frame 12 includes a cart pusher 24, a rolling cart stabilizer 28 including first and second rear wheels 221, 222, and the fold-control system 13 including the first and second cam-fold units 14, 15 as suggested in FIG. 5A. Cart pusher 24 is arranged to be gripped and pushed by a caregiver (not shown) when juvenile stroller 10 is configured to assume the expanded use mode as suggested in FIGS. 1, 6, and 9. Rear wheels 221, 222 included in rolling cart stabilizer 28 lie in spaced-apart relation to front wheels 21, 22 included in front cart 20 to enhance stability of mobile base 11 when juvenile stroller 10 is in the expanded use mode.

Figure 5B:
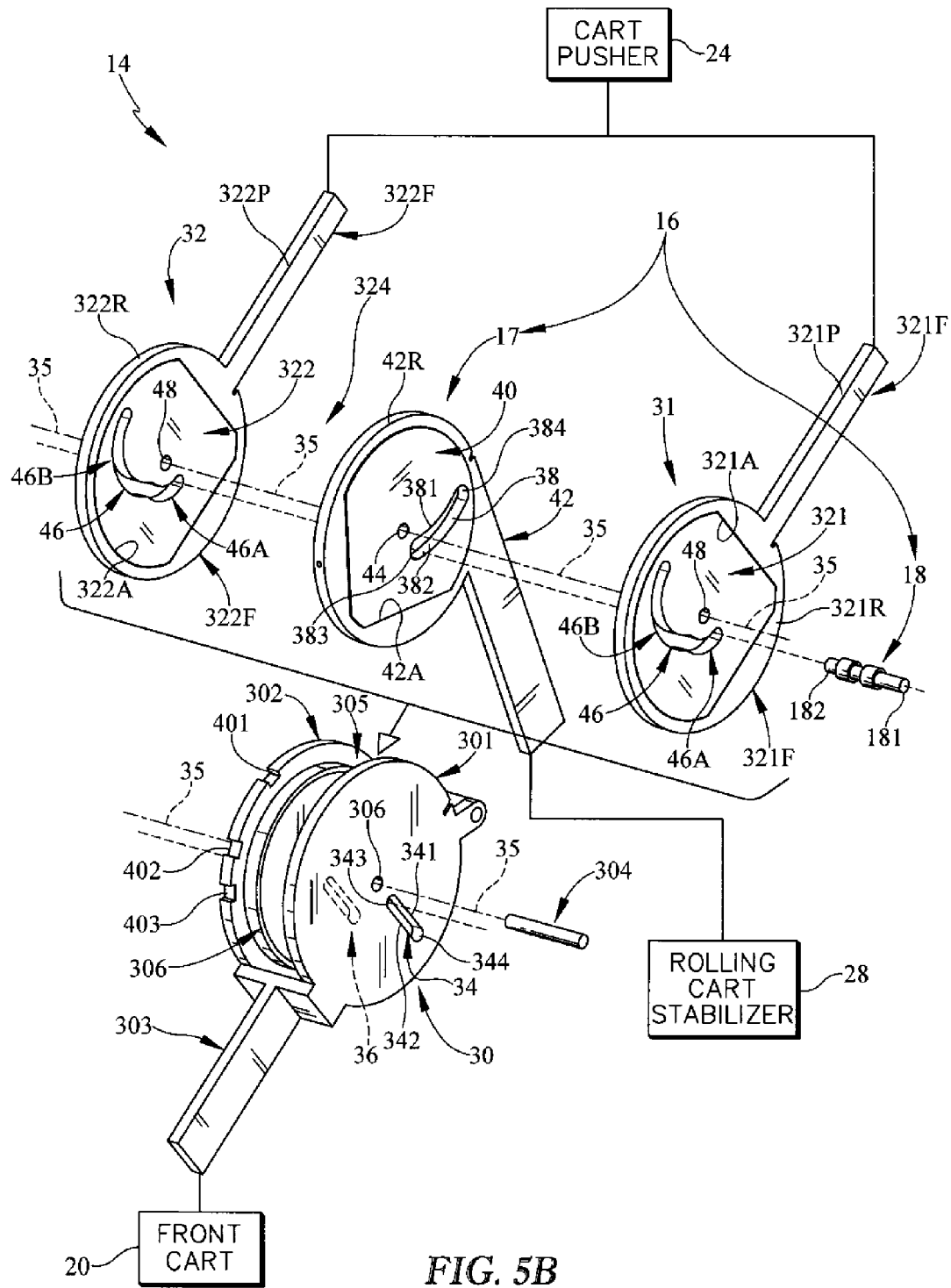
FIG. 5B is an enlarged perspective assembly view of the first cam-fold unit of the fold-control system showing that the first cam-fold unit includes a round hollow cam-support base formed to include a straight pin-receiver slot and adapted to be coupled to a leg included in the U-shaped front frame section in the front cart, a pair of spaced-apart pin movers, each pin mover being formed to include a curved motion-inducement slot and adapted to be coupled to an arm of the cart pusher, a follower located between the pair of spaced-apart pin movers and adapted to be coupled to a leg of the H-shaped rear frame section in the rolling cart stabilizer and formed to include a curved motion-transfer slot that is arranged to communicate in side-by-side relation with the curved motion-inducement slots formed in the companion pin movers during relative pivoting movement of the pin movers and follower about a common pivot axis as suggested in FIGS. 7-9, a cylinder-shaped pivot axle sized to extend along a horizontal pivot axis and through a central axle-receiving aperture formed in each of the cam-support base, follower, and pin movers, and a motion-transfer pin sized to extend through each of the curved motion-inducement and motion-transfer slots and also through the straight pin-receiver slot as suggested in FIGS. 7-9 and configured to cooperate with the follower to provide an inverse cam that operates to transfer pivoting motion of the cart pusher (induced by a caregiver) during folding of the foldable frame in the mobile base to cause the rolling cart stabilizer (and its rear wheels) to pivot about the horizontal pivot axis in a clockwise direction toward the front cart during forward pivoting movement of the cart pusher in a counterclockwise direction toward the front cart.

First cam-fold unit 14 is coupled to one side of front cart 20 and second cam-fold unit 15 is coupled to another side of front cart 20 as suggested in FIGS. 1-4. Each of first and second cam-fold units 14, 15 is coupled to cart pusher 24 and to rolling cart stabilizer 28 as suggested in FIGS. 1-4 and functions to move rolling cart stabilizer 28 relative to front cart 20 in response to caregiver-initiated movement of cart pusher 24 relative to front cart 20. First cam-fold unit 14 includes an illustrative set of components as shown in FIGS. 5A and 5B. Second cam-fold unit 15 includes a similar set of components as suggested in FIG. 5A.

As suggested in FIG. 5A, first cam-fold unit 14 includes a cam-support base 30, an inverse cam 16 including follower 17 and motion-transfer pin 18, and first and second pin movers 31, 32. Cam-support base 30 is coupled to front cart 20 to move therewith as suggested in FIGS. 4 and 5A. Follower 17 is coupled to rolling cart stabilizer 28 so that rolling cart stabilizer 28 moves relative to front cart 20 when follower 17 is moved relative to front cart 20 by movement of motion-transfer pin 18 and pin movers 31, 32 relative to front cart 20 as suggested in FIGS. 7-9. First pin mover 31 is coupled to cart pusher 24 so that first pin mover 31 moves relative to front cart 20 to cause relative movement of motion-transfer pin 18, follower 17, and rolling cart stabilizer 28 relative to front cart 20 when cart pusher 24 is moved by a caregiver (not shown) relative to front cart 20 as suggested in FIGS. 7-9. Second pin mover 32 is coupled to cart pusher 24 and arranged to lie in spaced-apart relation to first pin mover 31 to locate follower 17 therebetween as suggested in FIG. 5A. The function of second pin mover 32 is the same as the function of first pin mover 31.

Cam-support base 30 includes a first base member 301, a second base member 302, a base-member connector 303, and a pivot axle 304 in an illustrative embodiment shown in FIG. 5B. First and second base members 301, 302 are mated to one another to form a space 305 therebetween sized to receive portions of the follower 17 and the motion transfer pin 18 included in inverse cam 16 and portions of first and second movers 31, 32 therein. In an illustrative embodiment, pivot axle 304 is established by a bolt arranged to extend through a bolt-receiving aperture 306 formed in first base member 301 and a bolt-receiving aperture (not shown) formed in second base member 302 as suggested in FIG. 5B.

First base member 301 is formed to include a pin-receiver slot 34 as suggested in FIGS. 5B and 7-9. One end 181 of motion-transfer pin 18 of inverse cam 16 is arranged to extend into and move back and forth (i.e., up and down) in pin-receiver slot 34 during movement of cart pusher 24 and pin movers 31, 32 relative to front cart 20. In an illustrative embodiment, pin-receiver slot 34 is substantially straight and arranged to lie along a line extending through a pivot axis 35 established by pivot axle 304 as suggested in FIGS. 5B and 7-9.

Second base member 302 is formed to include an auxiliary pin-receiver slot 36 (shown in phantom) as suggested in FIG. 5B. Another end 182 of motion-transfer pin 18 of inverse cam 16 is arranged to extend into and move back and forth (i.e., up and down) in auxiliary pin-receiver slot 36 when first end 181 of motion-transfer pin 18 moves in pin-receiver slot 34 during movement of cart pusher 24 and pin movers 31, 32 relative to front cart 20. In an illustrative embodiment, auxiliary pin-receiver slot 36 is substantially straight and arranged to extend along a line extending through pivot axis 35 as suggested in FIG. 5B. In an illustrative embodiment, pin-receiver slots 34, 36 are arranged to lie in confronting alignment with one another as suggested in FIG. 5B when first and second base members 301, 302 are fixed to base-member connector 303 to lie in spaced-apart relation to one another.

Inverse cam 16 includes follower 17 and motion-transfer pin 18 as suggested in FIG. 5B. In an inverse cam, the functions of the parts are reversed (as compared to a traditional cam). In an inverse cam, the body with the groove is the driven member and the roller or other element that moves in the groove is the driver.

In an illustrative embodiment, follower 17 is formed to include a motion-transfer slot 38 as suggested in FIG. 5B. Motion-transfer pin 18 is arranged to extend into and move back and forth in motion-transfer slot 38 formed in follower 17 when motion-transfer pin 18 moves in pin-receiver slots 34, 36 formed in cam-support base 30 during movement of cart pusher 24 and pin movers 31, 32 relative to front cart 20 as suggested in FIGS. 7-9.

Motion-transfer slot 38 formed in follower 17 has a curved shape in the illustrative embodiment shown in FIG. 5B. Motion-transfer slot 38 is laid out in accordance with the present disclosure to cause motion-transfer pin 18 to impart a desired motion to follower 17 and to rolling cart stabilizer 28 during movement of cart pusher 24 and pin movers 31, 32 relative to front cart 20 as suggested in FIGS. 7-9.

Follower 17 of inverse cam 16 includes a follower plate 40 and a plate-support frame 42 coupled to follower plate 40 and to rolling cart stabilizer 28 as suggested in FIG. 5B. It is within the scope of this disclosure to form follower 17 from a single piece of material rather than two separate pieces 40, 42.

Figure 5C:
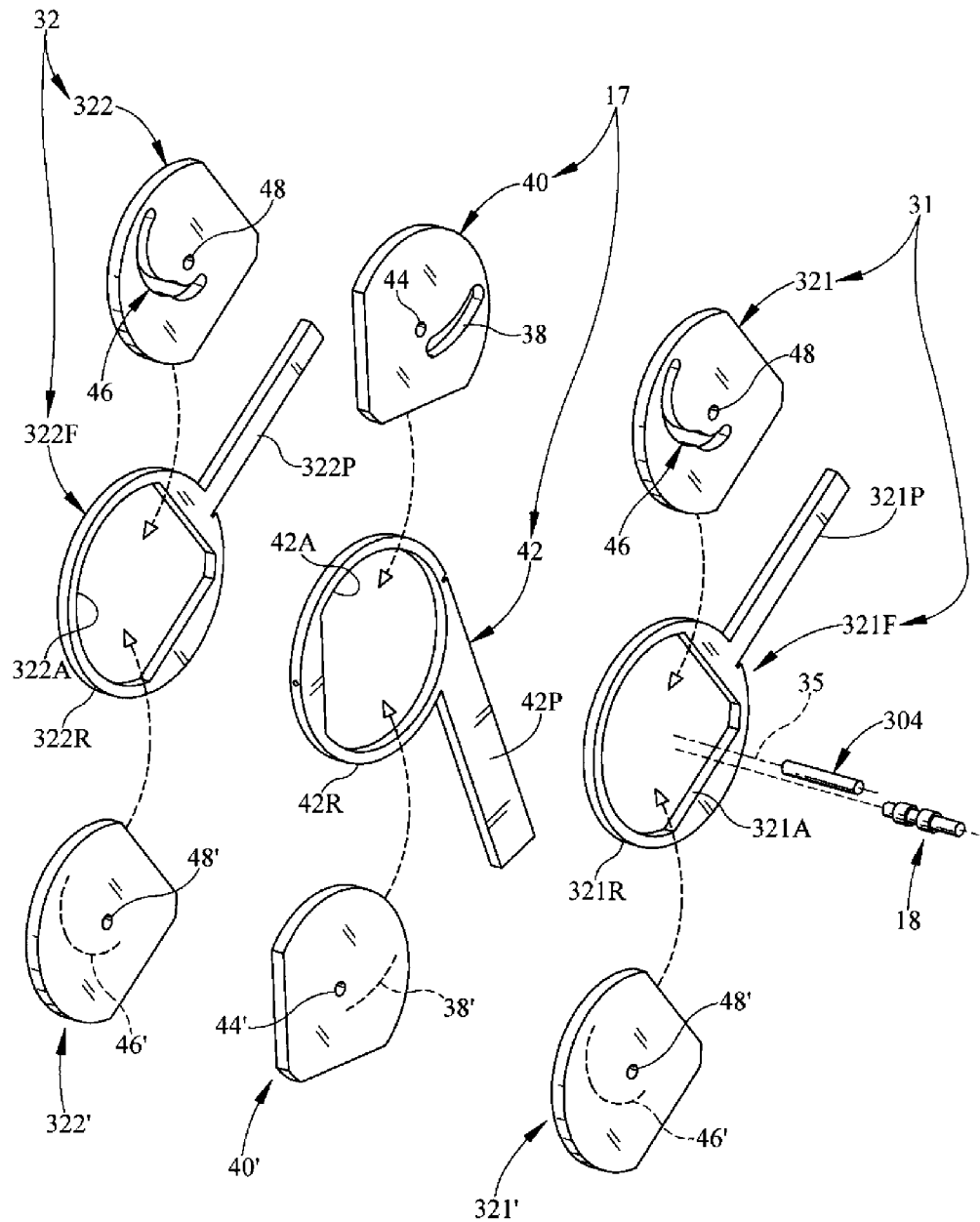
FIG. 5C is a perspective view showing (in a top row) that in an illustrative embodiment each of the first and second pin movers included in the first cam-fold unit shown in FIG. 5B comprises a (removable) modular pin-motion plate and that the follower included in the first cam-fold unit shown in FIG. 5B comprises a (removable) follower plate and that each of the pin-motion and follower plates is formed to include a central axle-receiving aperture sized to receive the pivot axle included in the first cam-fold unit and either a curved motion-inducement or a motion transfer slot sized to receive the motion-transfer pin included in the inverse cam and showing (in a middle row) an underlying companion plate-support frame provided for each of the pin movers and the follower and configured to mate either with the cart pusher or the rolling cart stabilizer and suggesting that it is within the scope of the present disclosure to provide an alternate set of modular pin-motion plates (shown in a bottom row) formed to include differently shaped curved motion-inducement and motion-transfer slots designed to provide an alternate cam-action folding path of movement of the cart pusher and the rolling cart stabilizer relative to the front cart when mounted in the companion plate-support frames shown in the middle row.
Figure 6:
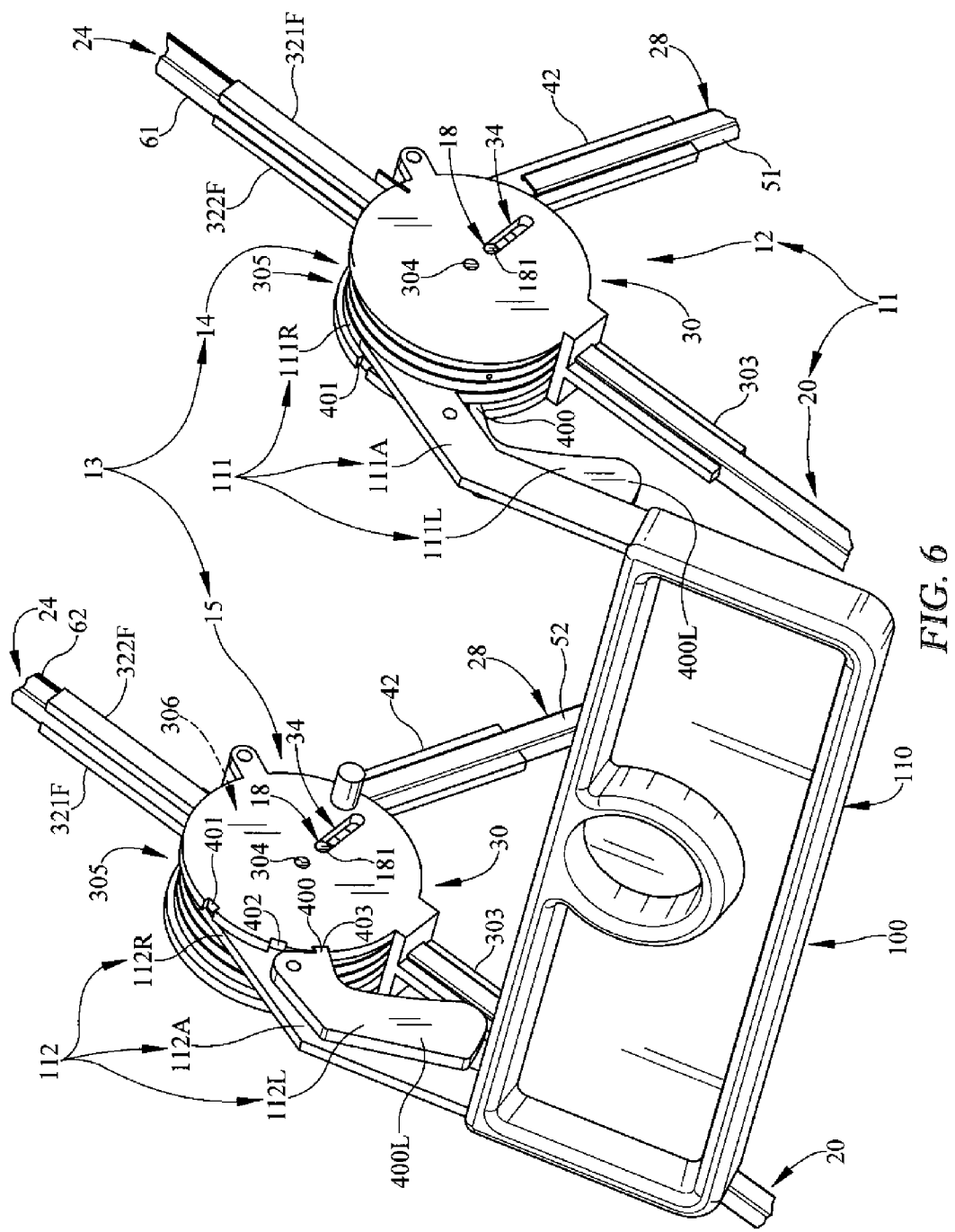
FIG. 6 is an enlarged view of a middle portion of the mobile base of FIG. 2 after the components included in each of the first and second cam-fold units shown in FIGS. 5A and 5B have been assembled and showing the feeding tray unit mounted on the first and second cam-fold units of the mobile base.

Follower plate 40 is arranged to lie and move in a plate-receiving space 305 formed in cam-support base 30 as suggested in FIGS. 5B and 6. Follower plate 40 is formed to include motion-transfer slot 38 as suggested in FIGS. 5B and 5C. Follower plate 40 is also formed to include an axle-receiving aperture 44. Pivot axle 304 extends through axle-receiving aperture 44 in an illustrative embodiment to provide means for supporting follower 17 for pivotable movement about pivot axis 35 as suggested in FIGS. 7-9.

First pin mover 31 of first cam-fold unit 14 includes a first pin-motion plate 321 and a first plate-support frame 321F coupled to first pin-motion plate 321 and to cart pusher 24 as suggested in FIG. 5B. It is within the scope of this disclosure to form first pin mover 31 from a single piece of material rather than two separate pieces 321, 321F. First pin-motion plate 321 is arranged to lie in plate-receiving space 305 formed in cam-support base 30 and move on pivot axle 304 about pivot axis 35 as suggested in FIGS. 5B and 6. A similar first pin mover 31 is also included in second cam-fold unit 15 of fold-control system 13 as suggested in FIG. 5A.

Second pin mover 32 of first cam-fold unit 14 includes a second pin-motion plate 322 and a second plate-support frame 322F coupled to second pin-motion plate 322 and to cart pusher 24 as suggested in FIG. 5B. It is within the scope of this disclosure to form second pin mover 32 from a single piece of material rather than two separate pieces 322, 322F. Second pin-motion plate 322 is arranged to lie in plate-receiving space 305 formed in cam-support base 30 and move on pivot axle 304 about pivot axis 35 as suggested in FIGS. 5B and 6. A similar second pin mover 32 is also included in second cam-fold unit 15 of fold-control system 13 as suggested in FIG. 5A.

First and second pin-motion plates 321, 322 of first pin mover 31 are coupled to cart pusher 24 as suggested in FIGS. 5B and 6. Pin-motion plates 321, 322 are arranged to lie in space-apart parallel relation to one another defining a space 324 therebetween, which space 24 receives follower plate 40 of follower 17 therein as suggested in FIG. 5B. Each of pin-motion plates 321, 322 is formed to include a motion-inducement slot 46 and an axle-receiving aperture 48 as suggested in FIG. 5B. Motion-transfer pin 18 is arranged to extend into and move back and forth in motion-inducement slots 46 during movement of cart pusher 24 and first pin mover 31 relative to front cart 20 as suggested in FIGS. 7-9. Pivot axle 304 is arranged to extend through axle-receiving apertures 48 to support first and second pin-motion plates 321, 322 for pivotable movement about pivot axis 35.

Motion-inducement slot 46 formed in each of pin-motion plates 321, 322 has a curved shape in the illustrative embodiment shown in FIG. 5. Motion-inducement slots 46 are laid out to cause motion-transfer pin 18 of inverse cam 16 to move along a certain predetermined path as motion-transfer pin 18 also moves in pin-receiver slots 34, 36 and motion-transfer slot 38 as suggested in FIGS. 7-9 during movement of cart pusher 24 and first pin mover 31 relative to front cart 20. Motion-inducement slot 46 has two curved sections as shown, for example, in FIG. 7 and each curved section has a different center and radius of curvature. The relatively longer segment has a greater radius of curvature as suggested in FIG. 7.

As suggested in FIG. 1, rolling cart stabilizer 28 includes a frame section 50 including first and second upright legs 51, 52 and a horizontal strut 54 mounted on legs 51, 52 of frame section 50. Frame section 50 is H-shaped in the illustrated embodiment. It is within the scope of this disclosure to provide frame section 50 with any suitable configuration. Rear wheels 221, 222 are coupled to lower ends of legs 51, 52 for rotation about axis of rotation 56.

Cart pusher 24 includes first side rail 61, second side rail 62, and push handle 63 as suggested in FIG. 5A. A lower end of first side rail 61 is coupled to first and second plate-support frames 321F, 322F of first cam-fold unit 14 as suggested in FIG. 5B. A lower end of second side rail 62 is coupled to first and second plate-support frames 321F, 322F of second cam-fold unit 15 as suggested in FIG. 5A. It is within the scope of this disclosure to provide cart pusher 24 with any suitable shape and structure.

Figure 2:
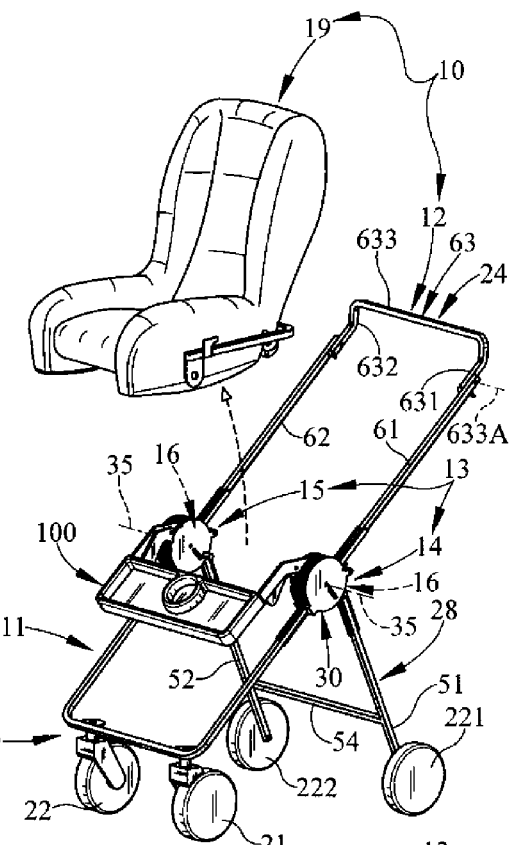
FIG. 2 is a perspective view similar to FIG. 1 of the collapsible juvenile stroller in an expanded use mode after removal of the juvenile seat from the cam-driven foldable frame and showing that the mobile base comprises a forwardly extending front cart including two front wheels, a fold-control system including a round first cam-fold unit coupled to a first leg included in the front cart and a separate round second cam-fold unit coupled to a second leg included in the front cart, a rolling cart stabilizer coupled to the first and second cam-fold units and configured to include two rear wheels, and a cart pusher coupled to the first and second cam-fold units and configured to include a U-shaped push handle, and showing that the juvenile stroller also includes a feeding tray unit mounted on the first and second cam-fold units of the mobile base to pivot about a pivot axis at the option of a caregiver from a horizontal extended position shown, for example, in FIG. 1 to an angled displaced position shown in FIGS. 2 and 15 and to a compact storage position shown, for example, in FIGS. 3 and 4.

Handle 63 of cart pusher 24 is U-shaped and includes a horizontally extending push bar 633, a first bar-support arm 631 coupled to one end of push bar 633 and pivotably coupled to an upper end of first side rail 61 at pivot axis 633A, and a second bar-support arm 632 coupled to another end of push bar 633 and pivotably coupled to an upper end of second side rail 62 at pivot axis 633A as suggested in FIG. 2. Push bar 633 can be locked by a user to remain in the use position shown in FIGS. 1, 5A, and 11 by operating a suitable lock mechanism 634 and then unlocked by the user and folded about pivot axis 633A to assume a compact folded position shown in FIGS. 3, 4, and 13. Handle 63 is configured to rotate about 180° about pivot axis 633A so that horizontally extending push bar 633 will not touch the ground when stroller 10 is folded as suggested in FIGS. 4 and 14. Handle 63 becomes the correct length for supporting the stroller 10 when folded as suggested in FIG. 14.

Front cart 20 includes a wheel-support base 70 and first and second base-carrier rails 71, 72 coupled to wheel-support base 70 as suggested in FIG. 5A. Front wheels 21, 22 are coupled to wheel-support base 70 as suggested in FIG. 5A. A free end of first base-carrier rail 71 is coupled to base-member connector 303 of the cam-support base 30 included in first cam-fold unit 14 of fold-lock system 13 as suggested in FIG. 5A. A free end of second base-carrier rail 72 is coupled to base-member connector 303 of the cam-support base 30 included in second cam-fold unit 15 of fold-lock system 13 as suggested in FIG. 5A. It is within the scope of this disclosure to provide front cart 20 with any suitable shape and structure.

First cam-fold unit 14 includes a cam-support base 30, inverse cam 16, and first and second pin movers 31, 32 as suggested in FIG. 5B. Cam-support base 30 is formed to include a pin-receiver slot 34 and a pivot axle 304 as suggested in FIG. 5B. Inverse cam 16 includes a follower 17 coupled to rolling cart stabilizer 28 to move therewith and mounted on pivot axle 304 to pivot about a pivot axis 35 established by pivot axle 304 as suggested in FIGS. 7-9. Inverse cam 16 also includes a motion-transfer pin 18 arranged to extend into and slide back and forth in pin-receiver slot 34 formed in cam-support base 30 and in a motion-transfer slot 38 formed in follower 17 and in motion-inducement slots 46 formed in pin-motion plates 321, 322 as suggested in FIGS. 7-9.

First pin mover 31 is coupled to cart pusher 14 to move therewith as suggested in FIGS. 7-9. First pin mover 31 is configured to provide means for moving motion-transfer pin 18 in a first direction 81 in pin-receiver slot 34 formed in cam-support base 30 and simultaneously in motion-transfer slot 38 formed in follower 17 as suggested in FIGS. 7-9 to apply a pivot-inducing force to follower 17 to cause follower 17 and rolling cart stabilizer 28 coupled to follower 17 to pivot on pivot axle 304 about pivot axis 35 in a clockwise direction 78 toward front cart 20 to assume a folded rear position alongside a rear portion of the front cart 20 as suggested in FIGS. 4, 9, and 14 in response to movement of cart pusher 14 about pivot axis 35 in a counterclockwise direction 79 toward front cart 20 so that stroller 10 is converted from an expanded use mode shown in FIG. 1 to a compact collapsed storage mode shown in FIG. 3.

Figure 3:
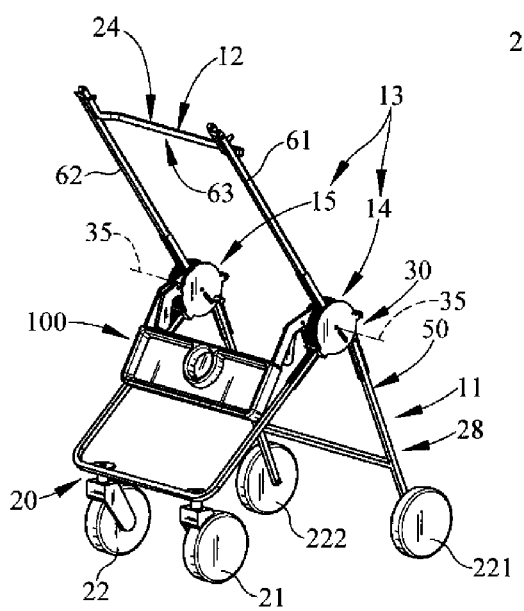
FIG. 3 is a perspective view of the mobile base after the feeding tray unit has been pivoted about the pivot axis to the compact storage position and the cart pusher has been pivoted in a forward direction about the pivot axis to initiate folding motion of the cam-driven foldable frame.

First pin mover 31 is also configured to provide means for alternatively moving motion-transfer pin 18 in a second direction 82 opposite to first direction 81 in pin-receiver 34 slot formed in cam-support base 30 and simultaneously in motion-transfer slot 38 formed in follower 17 to cause follower 17 and rolling cart stabilizer 28 coupled to follower 17 to pivot on pivot axle 304 about pivot axis 35 in a counterclockwise direction 79 away from front cart 20 to assume an unfolded front position extending in a rearward direction away from front cart 20 as suggested in FIGS. 1, 2, 7, 10, and 11 in response to movement of cart pusher 14 about the pivot axis 35 in a clockwise direction 78 away from front cart 20 so that stroller 10 is converted from the compact collapsed storage mode shown in FIG. 3 to the expanded use mode shown in FIGS. 1 and 2.

Pin-receiver slot 34 formed in cam-support base 30 is substantially straight and motion-transfer slot 38 formed in follower 17 is curved. Motion-transfer slot 38 is bounded by a curved inner edge 381 having a first radius of curvature and a curved outer edge 382 having a relatively larger second radius of curvature as shown in FIGS. 5B. Curved outer edge 382 is arranged to lie in spaced-apart relation to curved inner edge 381 and share a center of curvature with curved inner edge 381. Curved inner edge 381 is arranged to lie in a space provided between pivot axis 35 and curved outer edge 382 as suggested in FIG. 5B. Curved outer edge 382 has a concave shape and is arranged to face toward pivot axis 35 and curved inner edge 381 has a convex shape and is arranged to face away from pivot axis 35 as suggested in FIG. 5B.

Motion-transfer slot 38 formed in follower 17 is also bounded by a first end edge 383 and an opposite second end edge 384 as suggested in FIG. 5B. First end edge 383 interconnects curved inner and outer edges 381, 382 and lies at a first end of motion-transfer slot 38 to mate with motion transfer pin 18 upon arrival of follower 17 and rolling cart stabilizer 28 at the unfolded rear position associated with the expanded use mode of the stroller 10 as suggested in FIG. 7. Second end edge 384 interconnects curved inner and outer side edges 381, 382 and lies at an opposite second end of motion-transfer slot 38 to mate with motion-transfer pin 18 upon arrival of follower 17 and rolling cart stabilizer 28 at the folded rear position associated with the compact collapsed storage mode of stroller 10 as suggested in FIG. 9.

Pin-receiver slot 34 formed in first base member 301 of cam-support base 30 is bounded by substantially straight first and second side edges 341, 342 arranged to lie in substantially spaced-apart parallel relation to one another as suggested in FIG. 5B, a first end edge 343 arranged to interconnect first and second side edges 341, 342 and to lie in spaced-apart relation to pivot axis 35 at a first end of pin-receiver slot 34 as suggested in FIGS. 5B and 9, and a second end edge 344 arranged to interconnect first and second side edges 341, 342 and to lie in an opposite second end of pin-receiver slot 34 in a location between the pivot axis 35 and the first end edge 341 associated with pin-receiver slot 34 as suggested in FIGS. 5B and 7. Motion-transfer pin 18 of inverse cam 16 is arranged to lie in closely confronting relation to first end edge 343 associated with pin-receiver slot 34 upon arrival of follower 17 and rolling cart stabilizer 28 at the unfolded rear position associated with the expanded use mode of stroller 10 as suggested in FIG. 7. Motion-transfer pin 18 is arranged to lie in closely confronting relation to second end edge 344 associated with pin-receiver slot 34 upon arrival of follower 17 and rolling cart stabilizer 28 at the folded rear position associated with the compact collapsed storage mode of stroller 10 as suggested in FIG. 9.

Pin-oscillator means is defined by an interior wall included in first pin mover 31 and configured to form a curved motion-inducement slot 46 receiving motion-transfer pin 18 therein as suggested in FIG. 5B. Curved motion-inducement slot 46 is bounded by a curved inner edge and a curved outer edge and arranged to lie in spaced-apart relation to the curved inner edge and share a center of curvature with curved inner edge as suggested in FIGS. 5B and 7.

The curved outer edge associated with curved motion-inducement slot 46 is configured to provide first mover means for moving motion-transfer pin 18 in pin-receiver slot 34 in the first direction 81 from the first end 343 of pin-receiver slot 34 toward the second end 344 of pin-receiver slot 34 in response to movement of cart pusher 24 about pivot axis 35 in the counterclockwise direction 79 toward front cart 20 as suggested in FIGS. 7-7. The curved inner edge associated with curved motion-inducement slot 46 is configured to provide second mover means for moving motion-transfer pin 18 in pin-receiver slot 34 in the second direction 82 from the second end 344 of pin-receiver slot 34 toward the first end 343 of pin-receiver slot 34 in response to movement of cart pusher 24 about pivot axis 35 in the clockwise direction 78 away from front cart 20.

First pin mover is coupled to pivot axle 304 to pivot about pivot axis 35 established by pivot axle 304 in response to movement of cart pusher 24 about pivot axis 35 as suggested in FIGS. 7-9. Curved motion-inducement slot 46 includes two interconnected curved slot sections as shown in FIGS. 5B and 6. Each of those curved slot sections has a different radius of curvature in the illustrated embodiment.

A first curved section 46A of curved motion inducement slot 46 is shown in FIG. 7 and bounded by a curved inner edge having a first radius of curvature and a companion curved outer edge having a relatively larger second radius of curvature. The curved outer edge of slot 46A is arranged to lie in spaced-apart relation to the curved inner edge of slot 46A and to share a center of curvature with that curved inner edge. A portion of that curved inner edge is arranged to lie in a space provided between pivot axis 35 and the companion curved outer edge as suggested in FIG. 7. The curved outer edge of slot 46B has a concave shape and is arranged to face toward pivot axis 35 and the companion curved inner edge has a convex shape and is arranged to face away from pivot axis 35 as suggested in FIG. 7.

A second curved section 46B of curved motion-inducement slot 46 is shown in FIG. 7 and bounded by a curved inner edge having a first radius of curvature and a companion curved outer edge having a relatively larger second radius of curvature. The curved outer edge of slot 46B is arranged to lie in spaced-apart relation to the curved inner edge and share a center of curvature with that curved inner edge. A portion of that inner edge is arranged to lie in a space provided between pivot axis 35 and the companion curved outer edge as suggested in FIG. 7. The curved outer edge has a concave shape and is arranged to face toward pivot axis 35 and the companion curved inner edge has a convex shape and is arranged to face away from pivot axis 35 as suggested in FIG. 7.

Cam-support base 30 includes a first base member 301 formed to include pin-receiver slot 34 and a second base member 302 formed to include an auxiliary pin-receiver slot 36 and arranged to cooperate with first base member 301 to form a plate-receiving space 305 therebetween as suggested in FIG. 5B. Follower 17 of the inverse cam 16 includes a follower plate 40 formed to include motion-transfer slot 38 and arranged to lie in plate-receiving space 305 in a position between first and second base members 301, 302. Motion-transfer pin 18 is arranged to extend into and move in each of pin-receiver slot 34 formed in first base member 301 and the auxiliary pin-receiver slot 36 formed in second base member 302 and to extend through and move in motion-transfer slot 38 formed in follower plate 40 as suggested in FIGS. 7-9.

First pin mover 31 includes a first pin-motion plate 321 formed to include a motion-inducement slot 46 as suggested in FIG. 5B. First pin-motion plate 321 is arranged to lie in plate-receiving space 305 in a position between first base member 301 and follower plate 40 as suggested in FIG. 5B.

Motion-transfer pin 18 of inverse cam 16 is arranged to extend through and move in pin-receiver slots 34, 36, motion-transfer slot 58, and motion-inducement slot 46 as suggested in FIGS. 7-9. Pin-receiver slot 34 is substantially straight and each of motion-transfer and motion inducement slots 38, 46 is curved. Motion-transfer and motion-inducement slots 38, 46 cooperate to form a substantially U-shaped pattern as shown in FIG. 7 when follower 17 and rolling cart stabilizer 28 are moved to assume the unfolded front position extending in a forward direction away from front cart 20.

Follower 17 of inverse cam 16 includes a follower plate 40 formed to include motion-transfer slot 38 and mounted on pivot axle 304 to pivot about pivot axis 35 and a plate-support frame 42 arranged to interconnect rolling cart stabilizer 28 and follower plate 40 as suggested in FIG. 5. Plate-support frame 42 is configured to provide means for pivoting rolling cart stabilizer 28 about pivot axis 35 in response to pivoting movement of follower plate 40 on pivot axle 304 about pivot axis 35 as suggested in FIGS. 7-9. First pin mover 32 includes a first pin-motion plate 321 formed to include a motion-inducement slot 46 defining the pin-oscillator means and receiving motion-transfer pin 18 therein and mounted on pivot axle 304 to pivot about pivot axis 35 as suggested in FIG. 5B. Cam-support base 30 includes first and second base members 301, 302 arranged to lie in spaced-apart relation to one another to locate follower plate 40 in a plate-receiving space 305 provided therebetween as suggested in FIG. 5B. A portion of plate-support frame 42 is arranged to lie outside of plate-receiving space 304 as suggested in FIGS. 7-9.

First pin mover 31 includes a first pin-motion plate 321 located in plate-receiving space 305 and arranged to lie between first base member 301 and follower plate 40 as suggested in FIGS. 5A-B. First pin-motion plate 321 is formed to include a motion-inducement slot 46 (e.g., slots 46A, 46B) defining the pin-oscillator means and receiving the motion-transfer pin 18. First pin-motion plate 321 is mounted on follower axle 304 to pivot about pivot axis 35.

It is within the scope of the present disclosure to provide replaceable modular pin-motion and follower plates for use in follower 17 and first and second pin movers as suggested in FIG. 5C. Each of frames 42, 321f, and 322F is formed to include a plate-receiving aperture that is sized to receive a companion plate as suggested in FIG. 5C. Suitable means is provided within the scope of the present disclosure to retain each plate in its companion frame to allow removal and replacement of such plates.

A first set of plates 321, 40, 322 is shown in a top row and an alternative second set of plates 321, 40, 322 is shown in a bottom row in FIG. 5C. Each plate in the bottom row is formed to include an axle-receiving aperture (44 or 48), along with a slot (38 or 46) having a shape that is different from the slot shapes provided in the top row plates 321, 40, 322 as suggested in FIG. 5C. It is within the scope of the present disclosure to allow a manufacturer to vary the folding path of the cart pusher and the rolling cart stabilizer relative to the front cart by varying the shape of the slots provided in the plates mounted in frames 42, 321F, and 322F simply by selecting a suitable plate characterized by a slot shape corresponding to the desired folding path from among a collection of replaceable modular plates.

As suggested in FIG. 5C, first plate-support frame 321F of first pin mover 31 includes a rim 321R and a post 321P coupled to rim 321R (and adapted to be coupled to cart pusher 24). Rim 321R is formed to include a plate-receiving aperture 321A and first pin-motion plate 321 is locate in plate-receiving aperture 321A and retained in mating engagement with rim 321R using any suitable means as suggested in FIGS. 5B and 5C. First pin-motion plate 321 can be removed and replaced with alternate first pin-motion plate 321 at the option of a manufacturer.

Second plate-support frame 322F includes second pin mover 32, a rim 322R, and a post 322P coupled to rim 322R (and adapted to be coupled to cart pusher 24) as suggested in FIG. 5C. Rim 322R is formed to include a plate-receiving aperture 322A and second pin-motion plate 322 is located in plate-receiving aperture 322A and retained in mating engagement with rim 322R using any suitable means as suggested in FIGS. 5B and 5C. Second pin-motion plate 322 can be removed and replaced with alternate second pin-motion plate 322 at the option of a manufacturer.

Plate-support frame 42 of follower 17 includes a rim 42R and a post 42P coupled to rim 42R (and adapted to be coupled to rolling cart stabilizer 28) as suggested in FIG. 5C. Rim 42R is formed to include a plate-receiving aperture 42A and follower plate 40 is located in plate-receiving aperture 42A and retained in mating engagement with rim 42R using any suitable means as suggested in FIGS. 5B and 5C. Follower plate 42 can be removed and replaced with alternate follower plate 42 at the option of a manufacturer.

Feeding tray unit 100 is mounted on first and second cam-fold units 14, 15 as suggested in FIGS. 5A and 6 for selective pivotable movement about pivot axis 35 relative to mobile base 11 at the option of a caregiver as suggested in FIGS. 1-4 and 10-14. Feeding tray unit 100 includes a tray 110, a first tray mount 111 including a first mount ring 111R, a first support arm 111A, and a movable first arm lock 111L, and a second tray mount 112 including a second mount ring 112R, a second support arm 112A, and a movable second arm lock 112L as suggested in FIG. 5A.

To support feeding tray unit 100 for pivotable movement about pivot axis 35, the cam-support base 30 in each of first and second cam-fold units 14, 15 includes a round pivot mount 306 located in plate-receiving space 305 as suggested in FIGS. 5A and 5B. Round pivot mount 306 includes a cylindrical exterior bearing surface adapted to mate in rotative bearing engagement with one of first and second mount rings 111R, 112R. First mount ring 111R of first tray mount 111 mates with round pivot mount 306 of first cam-fold unit 14. Second mount ring 112R of second tray mount 112 mates with round pivot mount 306 of second cam-fold mount 15.

Anchor-receiver notches 401, 402, and 403 are formed in a peripheral portion of each of the second base members 302 included in first and second cam-fold units 14, 15 as suggested in FIGS. 5A, 5B, 6, and 7. Each of movable first and second arm locks 111L, 112L includes an anchor 400 sized to extend into each of anchor-receiver notches 401, 402, 403 and an anchor lever 400L coupled to companion anchor 400 as suggested in FIGS. 5A, 5B, and 6.

Anchors 400 of first and second arm locks 111L, 112L are moved to extend into companion anchor-receiver notches 403 formed in first and second cam-fold units 14, 15 to retain tray unit 100 in a compact storage position relative to mobile base 11 as suggested in FIGS. 3, 6, and 13. A caregiver can move anchor levers 400L to cause anchors 400 to disengage anchor-receiver notches 403 and then pivot tray 110 about the pivot axis to cause anchors 400 to extend into anchor receiver notches 402 to establish the angled displaced position of tray unit 100 shown in FIGS. 2 and 15 or to extend into anchor-receiver notches 401 to establish the horizontal extended position of tray unit 100 shown in FIGS. 1 and 10. Feeding tray unit 100 is placed in the horizontal extended position when juvenile seat 19 is mounted on mobile base 11 as shown in FIG. 1 and in the compact collapsed position when juvenile stroller is moved to the compact collapsed storage mode shown in FIG. 4.

In operation, as cart pusher 24 is pivoted about pivot axis 35 in a counterclockwise direction 79, a rotating disk 321 included in first pin mover 31 and formed to include a motion-inducement slot 46 moves (e.g., pivots) with cart pusher 24 as suggested in FIGS. 7-0. Edges 461, 462 bounding motion-inducement slot 46 (see FIG. 7) drives motion-transfer pin 18 in pin-receivers 34, 36 formed in cam-support base 30 to convert rotational motion to linear travel as suggested in FIGS. 7-9. Motion-transfer pin 18 is also arranged to move in motion-transfer slot 38 formed in another rotating disk 40 to convert linear travel back to rotational motion causing rolling cart stabilizer 28 to be pivoted about pivot axis 35 in an opposite clockwise direction 78. Similarly, counterclockwise movement of cart pusher 24 causes counterclockwise movement of rolling cart stabilizer 28 about pivot axis 35. The slots 46, 34, 36, 38 work in conjunction with one another to create a limit of travel associated with the expanded use mode and the compact collapsed storage mode of juvenile stroller 10. In the present disclosure, there is only one moving part (e.g., motion-transfer pin 18) in each cam-fold unit 14, 15 that transfers rotating motion from one (cam) slot 46 to another (cam) slot 38.

It is within the scope of this disclosure to achieve multiple programmed motions by stacking rotating disks provided with different cam profiles. All the disks are constrained to rotate on a common center and the resulting motions are driven via a single motion-transfer pin arranged to extend into each of the cam slots formed in the disks. Different timing between actions can be accomplished within the scope of the present disclosure by incorporating a straight (dwell) area in the cam slot associated with an individual action. Motion-control is accomplished herein without use of parallelogram (no common center) drive mechanisms or hinges for creating motion from an opened position to a closed position. The common center approach disclosed herein is used for rotating parts in a juvenile stroller 10 (or other apparatus) to create a compact foldable mechanism.

Figure 15:
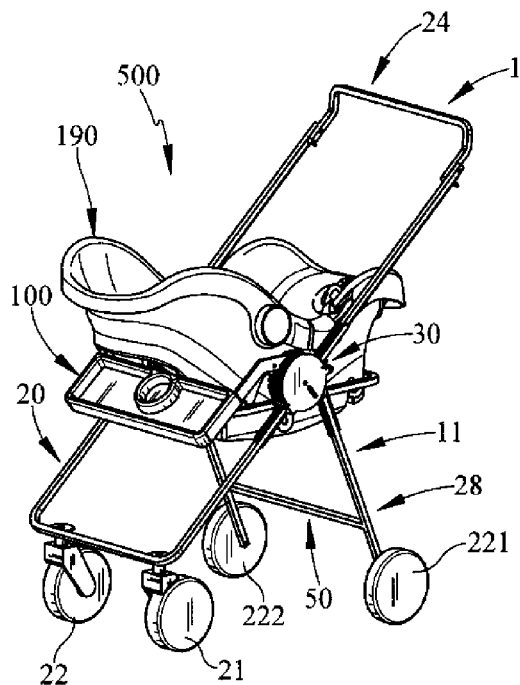
FIG. 15 is a perspective view of a collapsible juvenile stroller in accordance with a second embodiment of the present disclosure showing a juvenile seat (e.g., infant carrier) mounted on a mobile base of the type also shown in FIGS. 1-4 while a feeding tray is pivoted about a pivot axis to assume an angled displaced (infant-carrier) position.
Figure 16:
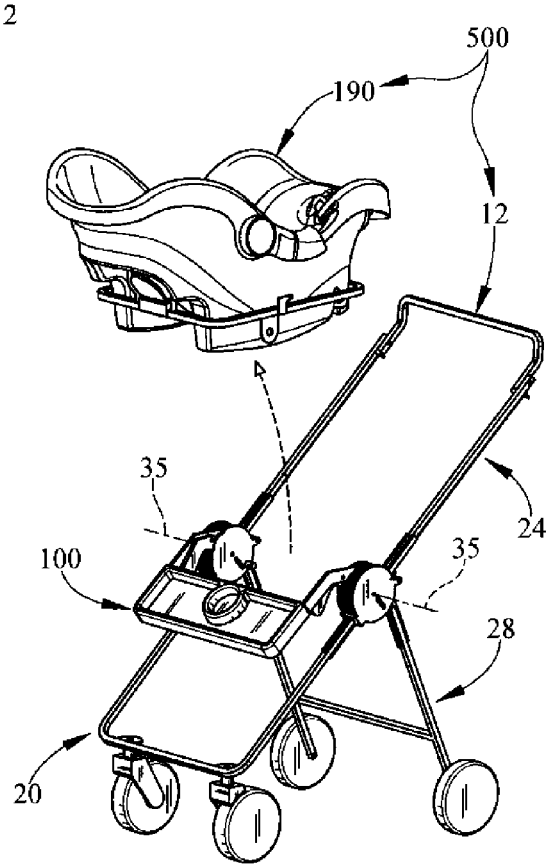
FIG. 16 is a perspective view similar to FIG. 15 after removal of the infant carrier from a cam-driven foldable frame included in the mobile base.
Figure 17:
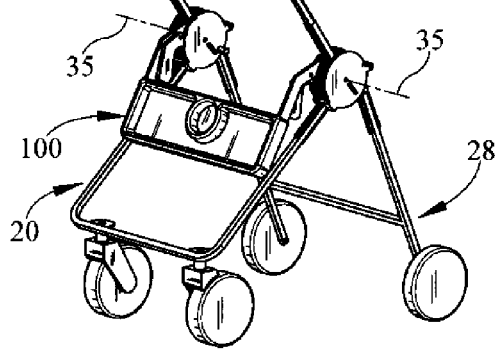
FIG. 17 is a perspective view of the mobile base after the feeding tray unit has been pivoted about the pivot axis to the compact storage position and the cart pusher has been pivoted in a forward direction about the pivot axis to initiate folding motion of the cam-driven foldable frame.
Figure 18:
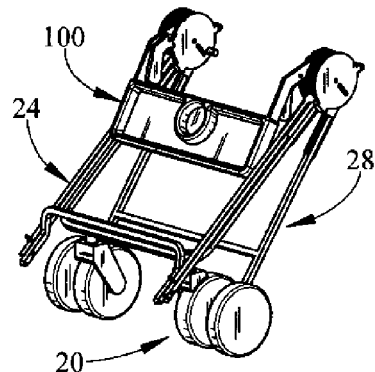
FIG. 18 is a perspective view of the juvenile stroller of FIGS. 1-3 (with the juvenile seat omitted) after it has been collapsed by a caregiver to assume a compact collapsed storage mode.

Mobile base 11 can be coupled to an infant carrier 190 while feeding tray unit 100 is locked in the angled displaced position as suggested in FIG. 15 to provide an infant stroller 500. Once infant carrier 190 is removed from mobile base 11 as suggested in FIG. 16, mobile base 11 can be compacted as suggested in FIGS. 17 and 18 and in FIGS. 19-23. Adaptors (not shown) are used to support infant carrier 190 on mobile base 11. These adaptors can be coupled to inner plates 302 of cam-support bases 30 in an illustrative embodiment. Feeding tray unit 100 must be moved relative to mobile base 11 to assume the angled displaced position to allow a caregiver to mount infant carrier 190 on mobile base 11.

The invention claimed is:
1. A compact collapsible stroller comprising
a mobile base and
a juvenile seat coupled to the mobile base,
wherein the mobile base includes a front cart including a front wheel and a cam-driven foldable frame mounted for folding and unfolding movement on the front cart and configured to include a cart pusher, a rolling cart stabilizer including a rear wheel, and a first cam-fold unit coupled to the front cart and to each of the cart pusher and the rolling cart stabilizer,
and wherein the first cam-fold unit includes a cam-support base formed to include a pin-receiver slot and a follower axle, an inverse cam including a follower coupled to the rolling cart stabilizer to move therewith and mounted on the follower axle to pivot about a pivot axis established by the follower axle and a motion-transfer pin arranged to extend into and slide back and forth in the pin-receiver slot formed in the cam-support base and in a motion-transfer slot formed in the follower, and a first pin mover coupled to the cart pusher to move therewith and configured to provide pin-oscillator means for moving the motion-transfer pin in a first direction in the pin-receiver slot formed in the cam-support base and simultaneously in the motion-transfer slot formed in the follower to apply a pivot-inducing force to the follower to cause the follower and the rolling cart stabilizer coupled to the follower to pivot about the pivot axis in a clockwise direction toward the front cart to assume a folded rear position alongside a rear portion of the front cart in response to forward movement of the cart pusher about the pivot axis in a counterclockwise direction toward the front cart so that the stroller is converted from an expanded use mode to a compact collapsed storage mode and for alternatively moving the motion-transfer pin in a second direction opposite to the first direction in the pin-receiver slot formed in the cam-support base and simultaneously in the motion-transfer slot formed in the follower to cause the follower and rolling cart stabilizer coupled to the follower to pivot about the pivot axis in a counterclockwise direction away from the front cart to assume an unfolded rear position extending in a rearward direction away from the front cart in response to rearward movement of the cart pusher about the pivot axis in a clockwise direction away from the front cart so that the stroller is converted from the compact collapsed storage mode to the expanded use mode.

2. The stroller of claim 1, wherein the pin-receiver slot formed in the cam-support base is substantially straight and the motion transfer slot formed in the follower is curved.

3. The stroller of claim 2, wherein the motion-transfer slot is bounded by a curved inner edge having a first radius of curvature and a curved outer edge having a relatively larger second radius of curvature and the curved outer edge is arranged to lie in spaced-apart relation to the curved inner edge and share a center of curvature with the curved inner edge.

4. The stroller of claim 3, wherein the curved inner edge is arranged to lie in a space provided between the pivot axis and the curved outer edge.

5. The stroller of claim 3, wherein the curved outer edge has a concave shape and is arranged to face toward the pivot axis and the curved inner edge has a convex shape and is arranged to face away from the pivot axis.

6. The stroller of claim 3, wherein the motion-transfer slot is also bounded by a first end edge and an opposite second end edge, the first end edge interconnects the curved inner and outer side edges and lies at a first end of the motion-transfer slot to mate with the motion-transfer pin upon arrival of the follower and the rolling cart stabilizer at the unfolded rear position associated with the expanded use mode of the stroller, and the second end edge interconnects the curved inner and outer side edges and lies at an opposite second end of the motion-transfer slot to mate with the motion-transfer pin upon arrival of the follower and the rolling cart stabilizer at the folded rear position associated with the compact collapsed storage mode of the stroller.

7. The stroller of claim 6, wherein the pin-receiver slot is bounded by substantially straight first and second side edges arranged to lie in substantially spaced-apart parallel relation to one another, a first end edge arranged to interconnect the first and second side edges and to lie in spaced-apart relation to the pivot axis at a first end of the pin-receiver slot, and a second end edge arranged to interconnect the first and second side edges and to lie in an opposite second end of the pin-receiver slot in a location between the pivot axis and the first end edge associated with the pin-receiver slot, and the motion-transfer pin is arranged to lie in closely confronting relation to the first end edge associated with the pin-receiver slot upon arrival of the follower and the rolling cart stabilizer at the unfolded rear position associated with the expanded use mode of the stroller and in closely confronting relation to the second end edge associated with the pin-receiver slot upon arrival of the follower and the rolling cart stabilizer at the folded rear position associated with the compact collapsed storage mode of the stroller.

8. The stroller of claim 2, wherein the pin-oscillator means is defined by an interior wall included in the first pin mover and configured to form a curved motion-inducement slot receiving the motion-transfer pin therein.

9. The stroller of claim 8, wherein the curved motion-inducement slot is bounded by a first curved inner edge having a first radius of curvature and a companion first curved outer edge having a relatively larger second radius of curvature and arranged to lie in spaced-apart relation to the first curved inner edge and share a center of curvature with the first curved inner edge.

10. The stroller of claim 9, wherein the pin-receiver slot is bounded by substantially straight first and second side edges arranged to lie in substantially spaced-apart parallel relation to one another, a first end edge arranged to interconnect the first and second side edges and to lie in spaced-apart relation to the pivot axis at a first end of the pin-receiver slot, and a second end edge arranged to interconnect the first and second side edges and to lie in an opposite second end of the pin-receiver slot in a location between the pivot axis and the first end edge associated with the pin-receiver slot, and the motion-transfer pin is arranged to lie in closely confronting relation to the first end edge associated with the pin-receiver slot upon arrival of the follower and the rolling cart stabilizer at the unfolded rear position associated with the expanded use mode of the stroller and in closely confronting relation to the second end edge associated with the pin-receiver slot upon arrival of the follower and the rolling cart stabilizer at the folded rear position associated with the compact collapsed storage mode of the stroller, the companion first curved outer edge associated with the curved motion-inducement slot is configured to provide first mover means for moving the motion-transfer pin in the pin-receiver slot in the first direction from the first end of the pin-receiver slot toward the second end of the pin-receiver slot in response to movement of the cart pusher about the pivot axis in the counterclockwise direction toward the front cart, and the first curved inner edge associated with the curved motion-inducement slot is configured to provide second mover means for moving the motion-transfer pin in the pin-receiver slot in the second direction from the second end of the pin-receiver slot toward the first end of the pin-receiver slot in response to movement of the cart pusher about the pivot axis in the clockwise direction away from the front cart.

11. The stroller of claim 8, wherein the first pin mover is coupled to the follower axle to pivot about the pivot axis established by the follower axle in response to movement of the cart pusher about the pivot axis.

12. The stroller of claim 11, wherein the curved motion-inducement slot is bounded by a first curved inner edge having a first radius of curvature and a companion first curved outer edge having a relatively larger second radius of curvature, the companion first curved outer edge is arranged to lie in spaced-apart relation to the first curved inner edge and share a center of curvature with the first curved inner edge, the first curved inner edge is arranged to lie in a space provided between the pivot axis and the companion first curved outer edge, and the companion first curved outer edge has a concave shape and is arranged to face toward the pivot axis and the first curved inner edge has a convex shape and is arranged to face away from the pivot axis.

13. The stroller of claim 1, wherein the cam-support base includes a first base member formed to include the pin-receiver slot and a second base member formed to include an auxiliary pin-receiver slot and arranged to cooperate with the first base member to form a plate-receiving space therebetween, the follower of the inverse cam includes a follower plate formed to include the motion-transfer slot and arranged to lie in the plate-receiving space in a position between the first and second base members, and the motion transfer pin is arranged to extend into and move in each of the pin-receiver slot formed in the first base member and the auxiliary pin-receiver slot formed in the second base member and to extend through and move in the motion-transfer slot formed in the follower plate.

14. The stroller of claim 13, wherein the first pin mover includes a first pin-motion plate formed to include a motion-inducement slot and arranged to lie in the plate-receiving space in a position between the first base member and the follower plate and the motion transfer pin is arranged to extend through and move in the motion-inducement slot.

15. The stroller of claim 14, wherein the pin-receiver slot is substantially straight and each of the motion-transfer and motion-inducement slots is curved.

16. The stroller of claim 15, wherein the motion-transfer and motion-inducement slots cooperate to form a substantially U-shaped pattern when the follower and the rolling cart stabilizer are moved to assume the unfolded front position extending in a forward direction away from the front cart.

17. The stroller of claim 1, wherein the follower of the inverse cam includes a follower plate formed to include the motion-transfer slot and mounted on the follower axle to pivot about the pivot axis and a plate-support frame arranged to interconnect the rolling cart stabilizer and the follower plate and configured to provide means for pivoting the rolling cart stabilizer about the pivot axis in response to pivoting movement of the follower plate about the pivot axis.

18. The stroller of claim 17, wherein the first pin mover includes a first pin-motion plate formed to include a motion-inducement slot defining the pin-oscillator means and receiving the motion-transfer pin therein and mounted on the follower axle to pivot about the pivot axis.

19. The stroller of claim 17, wherein the cam-support base includes first and second base members arranged to lie in spaced-apart relation to one another to locate the follower plate in a plate-receiving space provided therebetween and the plate-support frame includes a plate mount located in the plate-receiving space and coupled to the follower plate and a mount-support arm coupled to the plate mount and is arranged to extend outside of the plate-receiving space to mate with the rolling cart stabilizer.

20. The stroller of claim 19, wherein the first pin mover includes a first pin-motion plate located in the plate-receiving space and arranged to lie between the first base member and the follower plate and the first pin-motion plate is formed to include a motion-inducement slot defining the pin-oscillator means and receiving the motion-transfer pin therein.

21. The stroller of claim 20, wherein the first pin-motion plate is mounted on the follower axle to pivot about the pivot axis.

22. The stroller of claim 21, wherein the first pin mover further includes a plate-support frame arranged to interconnect the cart pusher and the first pin-motion plate and configured to provide means for pivoting the first pin-motion plate about the pivot axis in response to pivoting movement of the cart pusher about the pivot axis.

23. The stroller of claim 22, wherein the plate-support frame of the first pin mover includes a plate mount located in the plate-receiving space and coupled to the first pin-motion plate and a mount-support arm coupled to the plate mount and arranged to extend outside of the plate-receiving space.

24. A compact collapsible stroller comprising
a front cart including a front frame section and at least one front wheel mounted to rotate relative to the front frame section,
a rolling cart stabilizer including a rear frame section and at least one rear wheel mounted to rotate relative to the rear frame section,
a first cam-fold unit including a cam-support base coupled to the front frame section of the front cart to move therewith, an inverse cam including a follower coupled to the rolling cart stabilizer to move therewith and a motion-transfer pin arranged to extend into a pin-receiver slot formed in the cam-support base and a motion-transfer slot formed in the follower, and a first pin mover formed to include a motion-inducement slot receiving a portion of the motion-transfer pin therein, and
a cart pusher coupled to the first pin mover, wherein the motion transfer pin is arranged to move in a first direction simultaneously in each of the pin-receiver, motion-transfer, and motion inducement slots to contact the follower and the first pin mover to provide folding means for simultaneously rotating the follower about a pivot axis in a clockwise direction and the first pin mover about the pivot axis in an opposite counterclockwise direction to cause the follower and the rolling cart stabilizer coupled to the follower to pivot about the pivot axis in a clockwise direction toward the front cart to assume a folded rear position alongside a rear portion of the front cart in response to forward movement of the cart pusher about the pivot axis in a counterclockwise direction toward an opposite front portion of the front cart so that the stroller is converted from an expanded use mode to a compact collapsed storage mode and to provide unfolding means for simultaneously rotating the follower about the pivot axis in the counterclockwise direction and the first pin mover about the pivot axis in the clockwise direction to cause the follower and rolling cart stabilizer coupled to the follower to pivot about the pivot axis in a counterclockwise direction away from the front cart to assume an unfolded rear position extending in a rearward direction away from the front cart in response to movement of the cart pusher about the pivot axis in a clockwise direction away from the front cart so that the stroller is converted from the compact collapsed storage mode to the expanded use mode.

25. The stroller of claim 24, wherein the cam-support base includes a first base member formed to include the pin-receiver slot and a follower axle coupled to the first base member and arranged to establish the pivot axis, the follower is mounted on the follower axle for rotation about the pivot axis, and the first pin mover is mounted on the follower axle for rotation about the pivot axis.

26. The stroller of claim 25, wherein the cam-support base further includes a second base member formed to include an auxiliary pin-receiver slot and the motion-transfer pin is arranged to extend into the auxiliary pin-receiver slot and move therein during movement of the motion transfer pin in the pin-receiver, motion-transfer, and motion-inducement slots.

27. The stroller of claim 26, wherein the first and second base members cooperate to define a space therebetween containing portions of the follower and first pin mover.

28. The stroller of claim 24, wherein each of the motion-transfer and motion-inducement slots are curved and the pin-receiver slot is substantially straight.

29. The stroller of claim 28, wherein the motion-transfer and motion-inducement slots cooperate to form a substantially U-shaped pattern when the follower and the rolling art stabilizer are moved to assume the unfolded front position extending in a forward direction away from the front cart.

30. A compact collapsible stroller comprising
a mobile base,
a feeding tray unit mounted for pivotable movement on the mobile base about a pivot axis between a horizontal extended position and a compact storage position, and
a juvenile seat adapted to be coupled to the mobile base,
wherein the mobile base includes a front cart and a cam-driven foldable frame mounted for folding and unfolding movement on the front cart and configured to include a cart pusher, a rolling cart stabilizer, and a first cam-fold unit coupled to the front cart and to each of the cart pusher and the rolling cart stabilizer,
wherein the first cam-fold unit includes a cam-support base formed to include a pin-receiver slot and a follower axle, an inverse cam including a follower coupled to the rolling cart stabilizer to move therewith and mounted on the follower axle to pivot about a pivot axis established by the follower axle and a motion-transfer pin arranged to extend into and slide back and forth in the pin-receiver slot formed in the cam-support base and in a motion-transfer slot formed in the follower, and a pin mover coupled to the cart pusher to move therewith and formed to include a curved motion-inducement slot, and the motion-transfer pin is arranged to extend into and slide back and forth in the curved motion inducement slot during movement of the curved motion-transfer slot and the substantially straight pin-receiver slot, and
wherein the feeding tray unit is arranged to assume the horizontal extended position when the rolling cart stabilizer is moved to assume an unfolded rear position away from a rear portion of the front cart and to assume the compact storage position when the rolling card stabilizer is moved to assume a folded rear position alongside the rear portion of the front cart.

31. The stroller of claim 30, further comprising an infant carrier adapted to be coupled to the mobile base upon pivotable movement of the feeding tray unit about the pivot axis to an angled displaced position located between the horizontal extended position and the compact storage position.

* * * * *